United States Patent [19]
Patrick et al.

[11] 4,212,317
[45] Jul. 15, 1980

[54] VACUUM INTERLOCK

[75] Inventors: E. Vincent Patrick, Lorton; Howard K. Dickson, Alexandria; Howard L. Dunmire, Stafford, all of Va.

[73] Assignee: The United States of America as represented by the Secretary of the Army, Washington, D.C.

[21] Appl. No.: 930,265

[22] Filed: Aug. 2, 1978

[51] Int. Cl.² .................... H01J 31/26; F16K 41/04
[52] U.S. Cl. ................................. 137/565; 414/217; 137/576; 251/335 B
[58] Field of Search .................. 251/335 B; 414/217; 417/152; 137/572, 576, 565

[56] References Cited

U.S. PATENT DOCUMENTS

| | | | |
|---|---|---|---|
| 1,727,281 | 9/1929 | Fulton | 251/335 B |
| 2,628,638 | 2/1953 | Herod et al. | 251/335 B |
| 3,112,759 | 12/1963 | Lucia | 251/335 B |
| 3,326,512 | 6/1967 | Clarke | 251/335 B |
| 3,379,210 | 4/1968 | Wheeler | 251/335 B |
| 3,587,879 | 6/1971 | Guernet | 414/217 |
| 3,656,454 | 4/1972 | Schrader | 414/217 |
| 3,774,881 | 11/1973 | Gregory | 251/335 B |

*Primary Examiner*—Martin P. Schwadron
*Assistant Examiner*—A. Michael Chamber
*Attorney, Agent, or Firm*—Nathan Edelberg; Robert P. Gibson; John E. Holford

[57] ABSTRACT

The invention provides a two part vacuum interlock for a vacuum chamber which utilizes the chamber itself as an interconnecting member.

2 Claims, 1 Drawing Figure

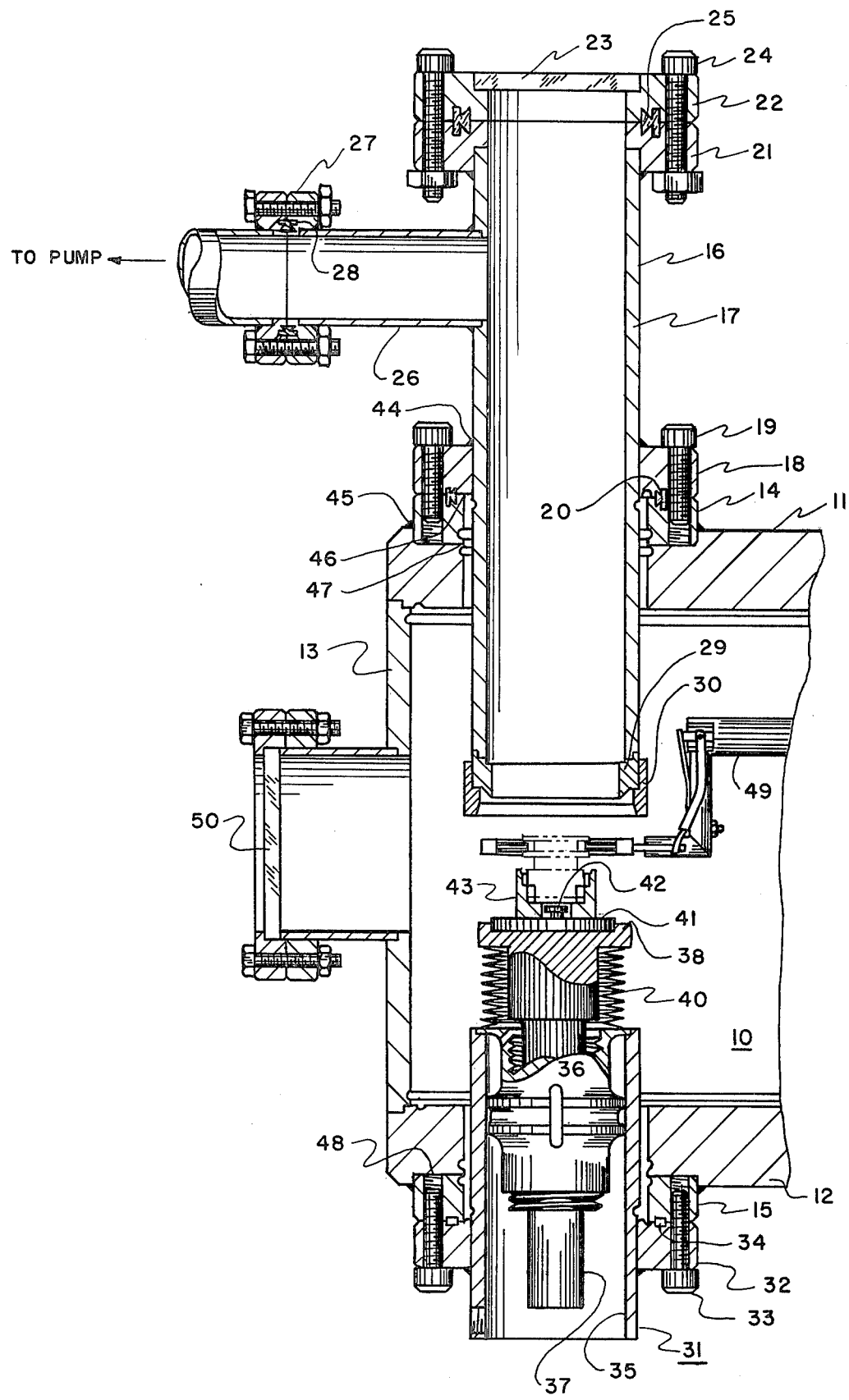

VACUUM INTERLOCK

The invention described herein may be manufactured, used, and licensed by the U.S. Government for governmental purposes without the payment of any royalties thereon.

BACKGROUND OF THE INVENTION

In Patent Application Ser. No. 930264 (EPA No. 1876) filed on even date herewith by E. Vincent Patrick et al for a "Method and Apparatus to Fabricate Image Intensifier Tubes," there is disclosed a unique vacuum chamber system. This system employs a special transport mechanism described in Patent Application Ser. No. 930437 (EPA No. 1877) also filed on even date herewith by E. Vincent Patrick et al for a "Vacuum Sealed Manipulator." The chambers in the vacuum system are generally cylindrical in shape and the manipulator in each chamber is generally a cantilever arm which moves tube parts around a large circle of process stations within the chamber. While the rotation of the arm about the axis of the chamber can be unrestricted, radial movement is limited to 25 mm and axial (vertical) movement to 40 mm. One function of the arm is to move parts into and out of a vacuum lock. With conventional designs, this is very difficult and in general requires extensive additional vacuum hardware and motion feedthroughs.

The conventional interlock uses an external vestibule which is added to a larger vacuum chamber by bolting onto the flange of an access port. The interlock chamber including the part entering or leaving the chamber remains outside the chamber. In the system described above, the manipulator cannot reach outside the chamber to position these parts as required. Additional mechanical devices must be added to the chamber. For example, part cradles that are magnetically propelled through glass walled tubing have been used for this function, but these complicate the task of keeping the chamber clean and can function improperly, on occasion damaging parts or delaying the vacuum processing underway, and by their configuration add a volume that is difficult to evacuate.

BRIEF DESCRIPTION OF THE INVENTION

It is an object of the present invention to provide a simple interlock structure which extends into and utilizes the wall structure of the main vacuum chamber in its operation. It is a further object to provide such an interlock wherein the part entering and leaving the vacuum is placed directly in the main chamber and is easily accessible once the interlock is open on the vacuum side. And further, an object is to provide a fully demountable interlock assembly such that any or all parts can be removed from the chamber for repair or replacement and such that the interlock can be installed in any suitably prepared opposed openings in the vacuum chamber. The interlock is to be bakeable to 400° C. and to this end incorporates a metal-to-metal sealing system in the vacuum valve portion of the interlock.

BRIEF DESCRIPTION OF THE DRAWINGS

These and other objects of the invention will be best understood with reference to the accompanying drawings, wherein:

The FIGURE shows a cutaway view of the two vacuum interlock members mounted on and in the main vacuum chamber.

DESCRIPTION OF INVENTION

In the above mentioned figure a portion of the main vacuum chamber 10 is defined by an upper generally circular wall 11, a similar lower wall 12 and a toroidal wall 13. These walls are welded together and have an upper portal flange member 14 and a lower portal flange member 15 welded thereto. The walls and flanges have mating openings for communication through the walls 11 and 12. One part 16 of the interlock, usually denoted as a vestibule, consists of a preferably straight upper tubing member 17 having a length preferably several times its diameter. This tube is supported by an auxiliary flange portion 18 welded thereto and coupled to flange 14 by bolts or machine screws 19. A vacuum seal between these two flanges is provided by a copper gasket 20 which fits into grooves in the flanges, the grooves containing standard knife edge ridges which bite into the gasket. Outside the chamber the tube 17 terminates in a flange 21. A cover 22, which may include a hermitically sealed window 23, is bolted to flange 21 by means of additional bolts 24 and the same type of sealing gasket 23 as found between flanges 14 and 18 is employed. A tee arm tube 26 of smaller diameter is welded into an aperture in tube 17 outside the chamber. This tube is also provided with a flange 27 and copper gasket assembly 28 as previously described to mate with the line to a standard sputter ion and roughing pump. This pump can reduce pressure in the smaller vestibule to approximately that of the main chamber in a fraction of time required to evacuate the main chamber and further includes a hand operated valve to flood the chamber, when desired, back to ambient atmospheric pressure.

The vacuum sealing function of the interlock is performed by a special configuration of the conventional poppet valve. To this end, the tube 17 inside the main chamber 10 terminates in a hardened stainless steel knife edge 29. This knife edge may be integral with tube 17 or be a separate coupling which is vacuum welded to the tube. The latter configuration facilitates construction and maintenance. A toroidal alignment collar 30 is added to the knife edge 29. The interior diameter of the alignment collar is tapered, decreasing in dimension in the direction of the knife edge.

A second part 31 of the interlock contains the poppet valve driver assembly 31 and the vacuum valve sealing disc 41. It is attached to portal flange 15 by means of a lower auxiliary flange 32, screws 33, and a copper gasket 34 and knife edges on the flange (not shown) as described previously. The driver assembly includes a preferably straight lower tubing member 35 welded to flange 32 which extends both inside and outside the chamber, its axis being coaxial with the upper tubing member 17. A stationary threaded driver member 36 fits within tubing member 35 and seats in an inner stepped portion of the end of the latter where it is vacuum welded in place. A rotatable driver member 37 is threaded through the stationary member and into a socket for rotation in a gate member 38. The outer end of the rotatable member 37 has a drive socket so that torsion can be applied. A bellows 40 completes the vacuum seal between the stationary member 40 and the gate member 38. The upper end of the gate member includes the usual metal (typically copper) vacuum sealing disc 41. The outer dimension of the gate member is either relieved or tapered to engage into the alignment collar 30. The mating of the tapered gate member and the tapered alignment collar is such that as the gate member moves into the alignment collar the sealing disc is aligned to the exact same location relative to the knife edge 29 so that the same cut is made in the sealing disc at each sealing cycle. The rotatable driver 37 is used to raise and lower the gate member and to apply the necessary force to obtain a leak tight vacuum seal between the sealing disc and the knife edge.

The two sections of the interlock are demountable from the main chamber by means of flange couplings 18 and 14 or 32 and 14. With the following configuration, standard, commercially available, vacuum flanges may be used for the coupling. Because of the high forces normally required to obtain a vacuum seal with metal-to-metal valve seals, typically 600 lbs per inch of knife edge circumference, all vacuum flanges must have auxiliary exterior welds, such as welds 44 and 45 on flanges 18 and 14, to reduce the stress on the vacuum welds 46 and 47. The flange gasket sealing system 20 must be one in which the flanges 18 and 14 can be bolted in contact and prestressed so that the force of sealing the disc 41 to knife edge 29 is absorbed by the bolt 19 preload without the reduction of the gasket 20 sealing pressure.

To assure sealing of the valve, care must be taken in construction so that the knife edge 29 is parallel to the mating face of flange 18 and similarly gate member 38 is parallel to flange 32. Minor deviations in concentricity due to mounting of the two separate interlock parts is corrected by alignment collar 30. Any portal to which the interlock is to be mounted must be suitably prepared in that the portal flanges 15 and 14 shall be parallel and have the reinforcing weldments discussed above. To this end, portal preparation is readily satisfied by counterbores such as 48. Chamber structure, such as walls 11 and 12 must be sufficiently rigid to accommodate the above sealing forces with minimum reflection.

With the above construction, the interlock is bakeable to 400° C. without loss of vacuum integrity. The minor variations in alignment due to the use of separate interlock members have resulted in no more than a 25% reduction in service range of sealing force for standard metal sealing discs. Thus the sealing disc is capable of hundreds of sealing cycles.

With the poppet valve closed (driver 37 fully up) parts to be transferred into the main chamber are entered into the vestibule 16 by removing the flange cover 22. By means of suitable part carriers, the part, or series of parts, are placed in cradle 43. This cradle is attached to the sealing disc 41 by means of a suitable protrusion 42 on the disc or blind topped holes into the disc. After resealing flange cover 22 and evacuating the vestibule 16, the driver is lowered and the cradle with parts moved into the main chamber. The parts are unstacked from the cradle by manipulator 49, of a type previously discussed, and distributed to appropriate locations in the chamber. With the poppet valve open, the manipulator arm is obviously freer to engage and remove the pabts. Finished assemblies or reject parts are removed from the chamber by the reverse of the above operation. The use of a vacuum window 50 facilitates the operation of part transfer from the cradle to the manipulator and permits sealing disc replacement without demounting the interlock. There is no limitation on the size of either the diameter of the vestibule or the open clearance between sealing disc 41 and alignment collar 30. Both dimensions can be designed to meet part size and numbers per load requirements. The only consideration is the increased force needed to obtain a vacuum seal for larger diameter valves and hence mechanical requirements for the strength of the chamber shell. For high vacuum compatibility, all members, except the sealing disc, are conveniently fabricated of stainless steel.

Sealing or locking tube 17 with the gate member automatically inserts the cradle 43 and its contents from the main chamber into the tube and unsealing or delocking performs the reverse function. Removing the cradle or its contents from the tube externally can be a more tedious operation, but being an external operation this is not critical. Generally the length of tube 17 will be about equal to the height of the chamber. The internal length in this embodiment was chosen to place the tube near the middle of the chamber and obviate the need for a long bellows 40 and long threaded driver members 36 and 37, since the sample height in this instance is only a small fraction of the chamber height. A tall sample would, of course, necessitate a short internal intrusion of tube 17 and a long external tube portion, as well as a long bellows and jack arrangement. The latter arrangement would also have the advantage of handling both short and tall samples. It might also be advantageous to stack a number of short samples into one tall load. The cradle could be designated to maintain each of these short samples at a fixed spacing from the non-rotatable gate member 38 and height of the latter varied to bring any desired sample within range of the arm 44.

Many variations of the above structures will be obvious to those skilled in the art, but the invention is not to be limited except as defined in the claims which follow.

We claim:

1. A vacuum interlock device for transporting samples into a main vacuum chamber having upper and lower opposed ports surrounded by external parallel portal flanges and a first pump means being in communication with said chamber for evacuation thereof, said device comprising;
    a tubular vestibule defining a center longitudinal axis and having first and second open ends said vestibule and said vacuum chamber defining two distinct chambers upon sealing contact of said gate member with said knife edge of said second end, said pump means allowing only evacuation of said vestibule when said distinct chambers are defined said second end being surrounded by a separate continuous knife edged ridge;
    a first auxiliary flange with a knife edged ridge surrounding said vestibule and permanently sealed thereto including a first gasket means to vacuum couple said vestibule to said upper portal flange with said second open end in said main chamber;
    a substantially cylindrical gate member having a continuous end surface portion defined by a metal softer than that in said knife edged ridges contacting said second open end of said vestibule only over the full length of its knife edge;
    a lower hollow tubing member surrounded by and sealed to a lower auxiliary flange, said tubing member and said gate member being substantially coaxial with said longitudinal axis;
    said lower auxiliary flange including a second gasket means to vacuum couple said tubing member to said lower portal flange;
    a driver means coupled between said gate member and reciprocatively mounted within said tubing member to reciprocate said gate member along said longitudinal axis normal to said continuous surface portion; and a vacuum type bellows having one end sealed to said gate member and its remaining end coupled to said tubing member, said bellows surrounding and excluding said driver means from the inside of said main vacuum chamber said first end including a removable cover means sealing said first end, 2. A device as set forth in claim 1 wherein said driver means comprises:

a stationary drive member permanently seated in said tubing member with a threaded aperture coaxial with said longitudinal axis; and a rotatable drive member threaded into said threaded aperture and socketed for rotation in said gate member.

* * * * *

UNITED STATES PATENT AND TRADEMARK OFFICE
CERTIFICATE OF CORRECTION

PATENT NO. : 4,212,317
DATED : July 15, 1980
INVENTOR(S) : E. Vincent Patrick, Howard K. Dickson and Howard L. Dunmire It is certified that error appears in the above-identified patent and that said Letters Patent are hereby corrected as shown below:

In Claim 1, a first Examiners amendment inserted at Column 4, lines 42-47 reading --said vestibule and said vacuum chamber defining two distinct chambers upon sealing contact of said gate member with said knife edge of said second end, said pump means allowing only evacuation of said vestibule when said distinct chambers are defined--should have instead been inserted at the end of the claim as part of the last paragraph;

a second Examiners amendment inserted at Column 5, lines 8 and 9 reading --said first end including a removable cover means sealing said first end.-- should have instead been inserted at lines 42-47 in place of the first Examiners amendment above; and a period (.) should have been inserted at Column 5, line 9, at the end of the claim.

Signed and Sealed this

Eleventh Day of November 19

[SEAL]

Attest:

Attesting Officer

SIDNEY A. DIAMOND
Commissioner of Patents and Tradem